May 11, 1971　　　F. W. VAN LUIK, JR　　　3,578,410
AMMONIA DETECTION, FOLLOWING ULTRAVIOLET RADIATION
Filed July 1, 1968
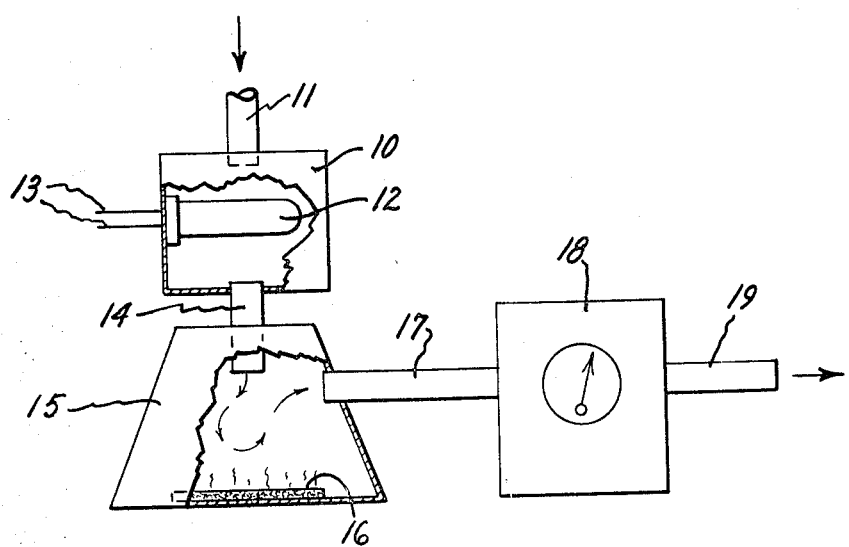
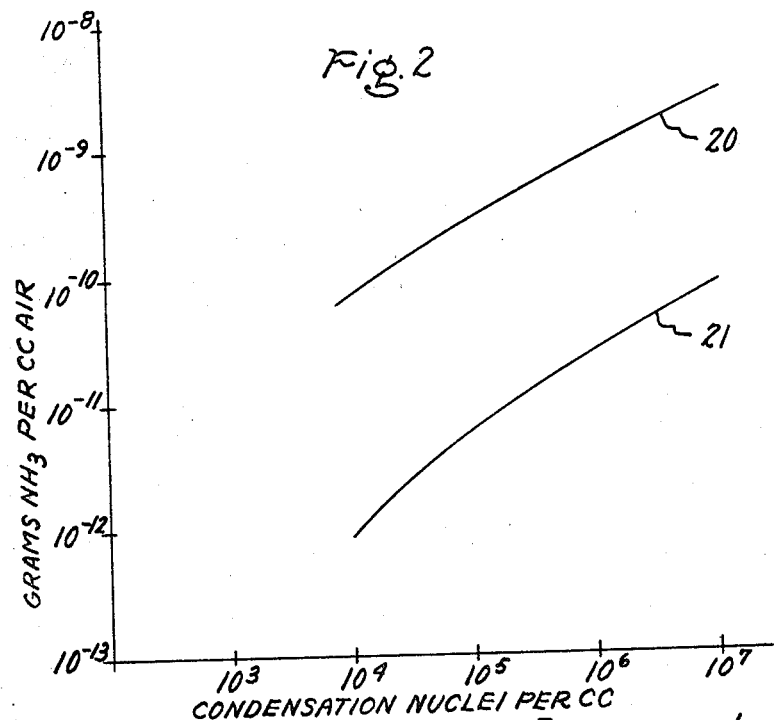
Inventor:
Frank W. Van Luik Jr.,
by John M. Davis
His Attorney.

United States Patent Office 3,578,410
Patented May 11, 1971

---

3,578,410
AMMONIA DETECTION, FOLLOWING ULTRAVIOLET RADIATION
Frank W. Van Luik, Jr., Schenectady, N.Y., assignor to General Electric Company
Filed July 1, 1968, Ser. No. 741,529
Int. Cl. G01n 21/26, 33/00; H01j 37/00
U.S. Cl. 23—232
4 Claims

ABSTRACT OF THE DISCLOSURE

If a gas such as air containing small amounts of ammonia is exposed to ultraviolet radiation prior to being contacted with an acid to form ammonia compound condensation nuclei, about 1000 times more nuclei are formed than if such radiation is omitted.

CROSS-REFERENCES

Ser. No. 516,013, filed Dec. 23, 1965, now Pat. No. 3,503,711 entitled "Ammonia Detection Apparatus and Method" in the name of George F. Skala, and Ser. No. 693,336, filed Dec. 26, 1967, entitled "Gas Conversion Apparatus" in the name of Peter E. Coffey, both assigned to the assignee of the present application.

BACKGROUND OF THE INVENTION

The present invention relates to the detection of the presence of ammonia in another carrier gas such as, for example, air. As shown and set forth in greater detail in the previously referenced co-pending patent applications, the presence of ammonia in a gas such as air may be detected and the concentration measured by exposing the gas to an acid vapor to convert the ammonia to a dispersion of very fine solid particles of an ammonia salt such as ammonium chloride and measuring the concentration by an instrument such as a condensation nuclei counter. As pointed out in the copending applications, the sensitivity of the converter may be greatly increased by exposing the gas to a corona discharge before or while the gas is being treated by the acid vapor. The equipment necessary for the generation of a corona discharge involves among other things an expensive and relatively bulky power supply and associated circuitry. It would be desirable to provide a gas conversion apparatus for detecting and measuring the ammonia concentration in another gas such as air which would eliminate the corona discharge circuitry without a substantial sacrifice in sensitivity.

It is therefore a principal object of this invention to provide such an apparatus. Other and specifically different objects of the invention will become apparent to those skilled in the art from the detailed description which follows, taken in conjunction with the accompanying drawing in which FIG. 1 is a schematic illustration of one embodiment of the invention with parts broken away for clarity of illustration, and FIG. 2 wherein the improved sensitivity achieved by the invention is graphically illustrated.

More specifically, and with reference to FIG. 1 of the drawing, one embodiment of the apparatus includes an irradiation chamber 10 provided with an inlet conduit means 11 which contains therein an ultraviolet lamp 12 with electrical leads 13. Preferably the ultraviolet lamp provides an intense source of radiation in the 1800 to 2600 A. wave length range. Such a lamp as the General Electric Company OZ–4 is an example of a suitable commercially available ultraviolet light source. An outlet conduit 14 provides communication between the interior of chamber 10 and the interior of reaction chamber 15 which includes therein a source of acid vapor, for example, a piece of porous sheet material 16, such as, for example, blotting paper saturated with hydrochloric acid. An outlet conduit 17 provides communication between the interior of chamber 15 and the inlet of a particle detector 18 such as, for example, a condensation nuclei detector obtainable commercially from the General Electric Company. The detector is provided with an outlet conduit 19.

In operation, the gas to be analyzed for ammonia content is passed through chamber 10 and irradiated therein by the ultraviolet light from lamp 12, through conduit 14 into chamber 15 wherein the ammonia in the gas is reacted with the acid vapor to form small particles of an ammonia salt, such as, for example, ammonium chloride as condensation nuclei. The gas sample containing the condensation nuclei is then passed through the condensation nuclei detector 18 and the concentration of the particles is determined, from which the concentration of ammonia originally present in the carrier gas may be determined.

The data graphically illustrated in FIG. 2 is a log-log plot of ammonia concentration in air versus the number of condensation nuclei determined by the condensation nuclei detector for a number of air samples containing known amounts of ammonia and using hydrochloric acid in the reaction chamber. In curve 20, these gas samples were passed through the apparatus of FIG. 1 with the ultraviolet lamp 12 turned off, and the data plotted in curve 21 are the results obtained when similar gas samples were passed through the apparatus with the ultraviolet lamp turned on. In these particular samples, the volume was 50 cc. each and the flow rate was 100 cc. per second.

As can be seen from the data, the employment of the ultraviolet light in conjunction with the reactor results in the production of about 1000 times the number of condensation nuclei than when the same apparatus is employed without the ultraviolet radiation.

While certain specific construction and materials have been disclosed as exemplary of the invention, it will be apparent to those skilled in the art that many variations may be made within the scope thereof. For example, chambers 10 and 15 may be consolidated into a single chamber, acids other than hydrochloric may be employed and means other than the porous material 16 may be employed to produce the acid vapor. For these reasons it is not intended that the invention be limited except as set forth in the appended claims.

What I claim as new and desire to secure by Letters Patent of the United States is:

1. A method for the detection and measurement of ammonia in a carrier gas comprising the steps of exposing a sample of the ammonia-containing gas to ultraviolet radiation having a wave length of from about 1800 to about 2600 angstroms, contacting said irradiated gas sample with acid vapor to produce ammonia compound condensation nuclei, and detecting and measuring said condensation nuclei.

2. The method recited in claim wherein said carrier gas is air.

3. The method recited in claim 1 wherein said acid is hydrochloric acid.

4. Apparatus for the determination of the concentration of ammonia in a carrier gas comprising a first radiation chamber containing an ultraviolet lamp and means for energizing said lamp to produce ultraviolet radiation having a wavelength of from about 1800 to about 2600 angstroms, means for introducing a gas sample into said radiation chamber, first conduit means for conveying said irradiated gas sample into a second reaction chamber containing acid vapor, and second conduit means for conveying said reacted gas sample from said reaction chamber to a condensation nuclei detector.

References Cited

UNITED STATES PATENTS

| | | | |
|---|---|---|---|
| 2,468,175 | 4/1949 | Cotton | 204—312 |
| 2,897,059 | 7/1959 | Van Luik, Jr. | 23—232E |
| 3,102,192 | 8/1963 | Skala | 23—232X |
| 3,152,056 | 10/1964 | Berghaus et al. | 204—177 |
| 3,198,721 | 8/1965 | Rich | 23—232X |
| 3,503,711 | 3/1970 | Skala | 23—232 |

OTHER REFERENCES

Van Luik, Jr., et al. Analytical Chemistry, vol. 34, pp. 1617–1620 (November 1962).

JOSEPH SCOVRONEK, Primary Examiner

U.S. Cl. X.R.

23—254; 204—157.1; 250—43.5